(12) United States Patent
Theobald

(10) Patent No.: US 9,387,833 B1
(45) Date of Patent: Jul. 12, 2016

(54) BRAKING A ROTATABLE POWER TRANSFER DEVICE

(71) Applicant: Daniel Theobald, Somerville, MA (US)

(72) Inventor: Daniel Theobald, Somerville, MA (US)

(*) Notice: Subject to any disclaimer, the term of this patent is extended or adjusted under 35 U.S.C. 154(b) by 0 days.

(21) Appl. No.: 14/184,744

(22) Filed: Feb. 20, 2014

(51) Int. Cl.
*B60T 8/64* (2006.01)
*B60T 1/06* (2006.01)
*B60T 7/04* (2006.01)

(52) U.S. Cl.
CPC .... *B60T 1/06* (2013.01); *B60T 7/04* (2013.01)

(58) Field of Classification Search
CPC .................................... B60T 1/06; B60T 7/04
USPC ..................................... 303/2, 3, 13, 151, 152
See application file for complete search history.

(56) References Cited

U.S. PATENT DOCUMENTS

| | | | | |
|---|---|---|---|---|
| 3,788,709 A | * | 1/1974 | Schwerin | B60T 7/06 188/3 R |
| 4,368,793 A | * | 1/1983 | Igarashi | B60S 9/215 180/11 |
| 4,658,939 A | * | 4/1987 | Kircher | B60T 8/1764 180/197 |
| 4,921,066 A | * | 5/1990 | Conley | G05G 1/34 180/322 |
| 8,214,108 B2 | * | 7/2012 | Post, II | B60W 50/0098 280/400 |
| 2002/0180263 A1 | * | 12/2002 | Minowa et al. | 303/125 |
| 2004/0090116 A1 | * | 5/2004 | Tsunehara | 303/152 |
| 2007/0273204 A1 | * | 11/2007 | Kodama et al. | 303/146 |
| 2008/0173490 A1 | * | 7/2008 | Itoh | 180/165 |
| 2011/0011206 A1 | * | 1/2011 | Knight et al. | 74/665 T |
| 2011/0233994 A1 | * | 9/2011 | Harding | B60T 1/10 303/152 |
| 2012/0313426 A1 | * | 12/2012 | Walser | 303/3 |
| 2013/0240274 A1 | * | 9/2013 | Vitale | B62D 47/003 180/65.1 |

* cited by examiner

*Primary Examiner* — Vishal Sahni
(74) *Attorney, Agent, or Firm* — Albert J. Brunett

(57) ABSTRACT

Systems and methods are provided involving a rotatable power transfer device configured with a first brake system and a second brake system. During a first of the methods, rotation of the power transfer device is braked using the first brake system. The first brake system may be actuatable by a first user interface; e.g., a brake pedal. The second brake system may be actuatable by a second user interface; e.g., a brake pedal.

10 Claims, 5 Drawing Sheets

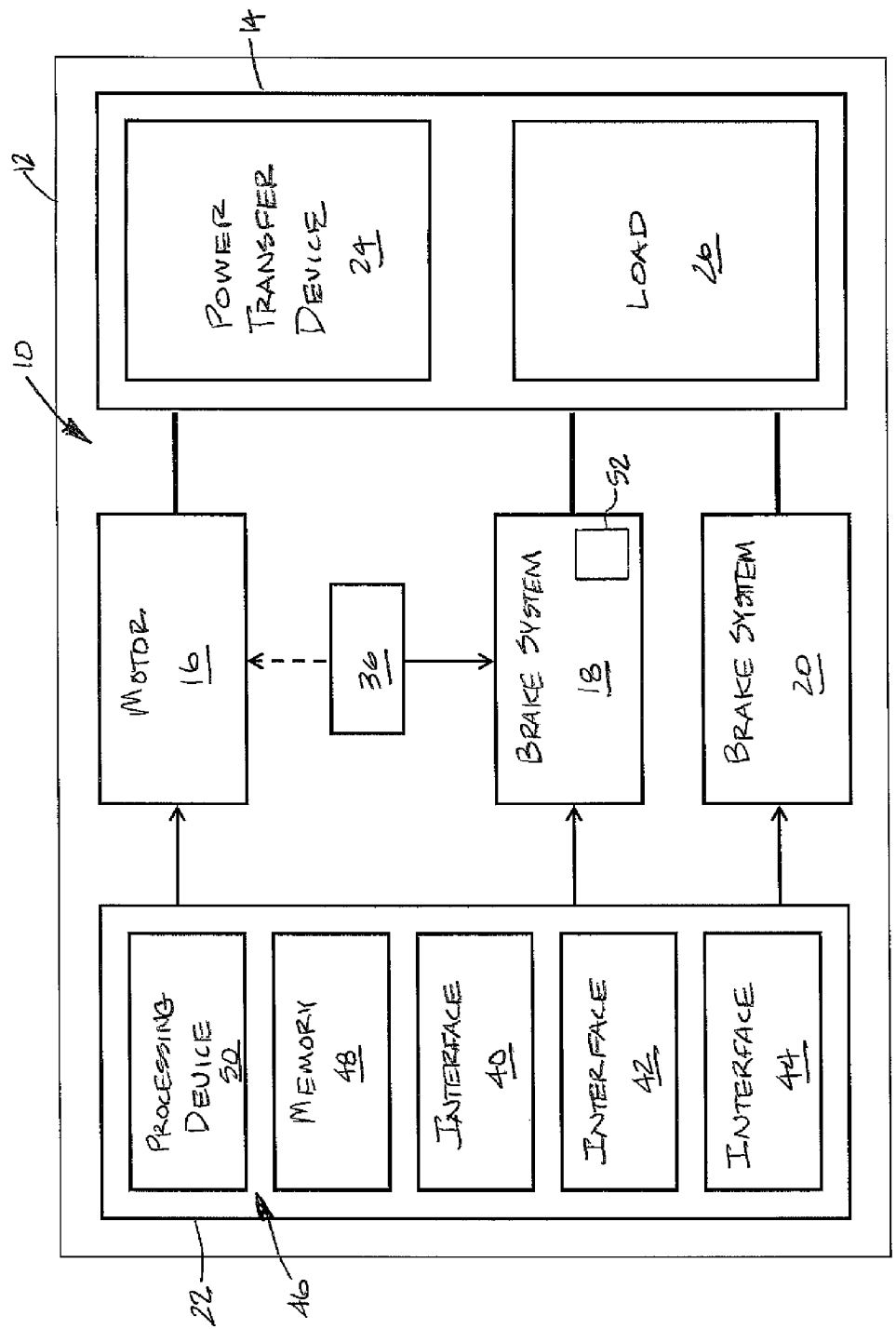

BRAKING A ROTATABLE POWER TRANSFER DEVICE

BACKGROUND OF THE INVENTION

1. Technical Field

The present invention relates generally to braking a rotatable power transfer device such as, for example, a driveshaft of an automobile.

2. Background Information

A typical automobile includes a friction brake system for braking rotation of drivetrain components and, thus, movement of the automobile. Some automobiles may also include a regenerative brake system for braking rotation of the drivetrain components. In such automobiles, the friction brake system and the regenerative brake system are electronically actuated and controlled by a computer. A driver therefore may have no real time control of when and how each of the brake systems is operated.

There is a need in the art for improved methods and systems for braking rotation of a drivetrain component and other rotatable power transfer devices.

SUMMARY OF THE DISCLOSURE

Systems and methods are provided involving a rotatable power transfer device configured with a first brake system and a second brake system. During a first of the methods, rotation of the power transfer device is braked using the first brake system. The first brake system may be actuatable by a first user interface; e.g., a brake pedal. The second brake system may be actuatable by a second user interface; e.g., another brake pedal.

BRIEF DESCRIPTION OF THE DRAWINGS

The following detailed description will be better understood when read in conjunction with the appended drawings, in which there is shown one or more embodiments of the present disclosure. It should be understood, however, that the various embodiments of the present disclosure are not limited to the precise arrangements and instrumentalities shown in the drawings.

FIG. 5 is a block diagram of another powertrain for the mechanical system.

DETAILED DESCRIPTION

Figure 1:
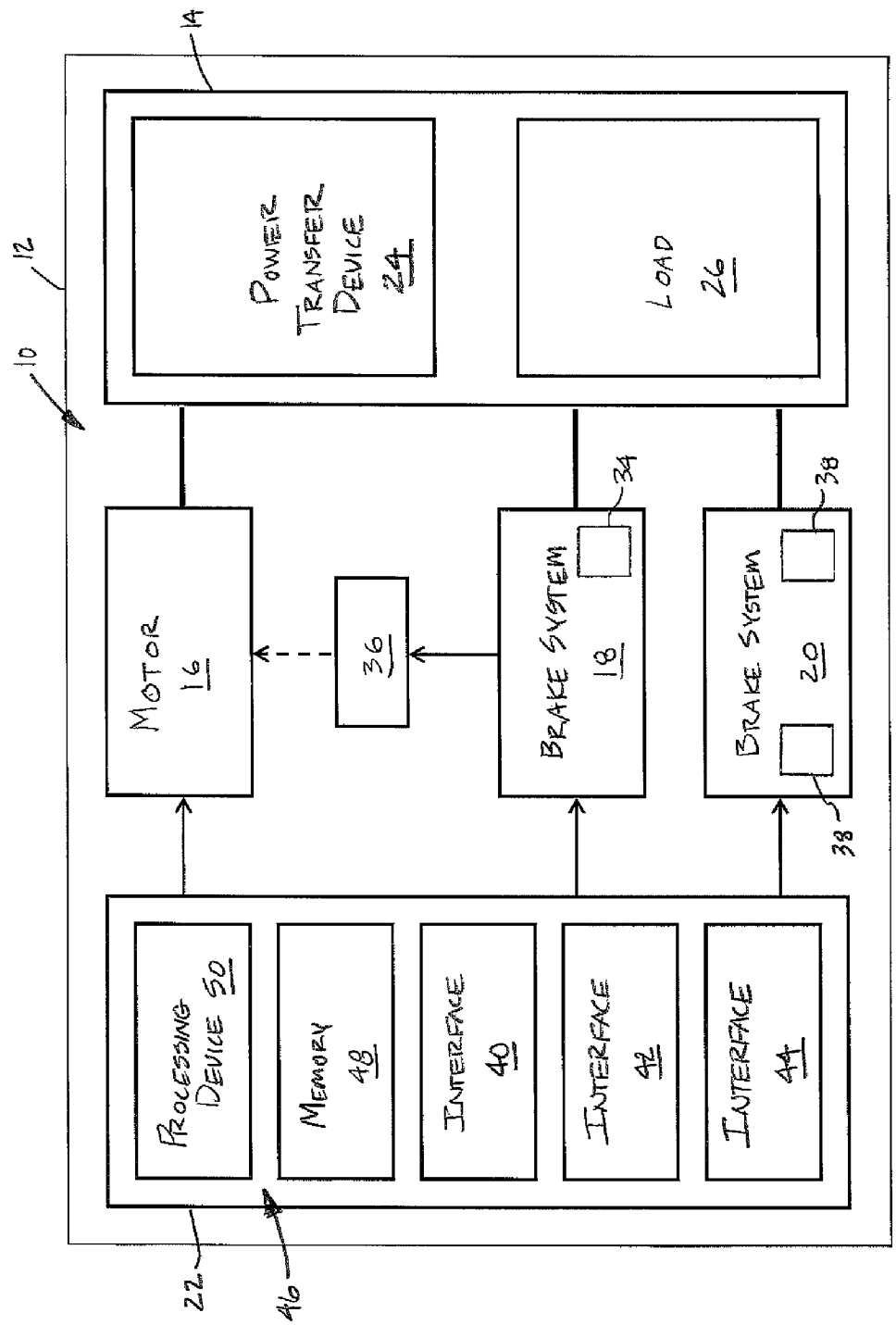
FIG. 1 is a block diagram of a powertrain for a mechanical system such as an automobile.

FIG. 1 illustrates a powertrain 10 for a mechanical system 12. This mechanical system 12 may be configured as a land, water and/or air based vehicle. Examples of such a vehicle include, but are not limited to, an automobile, a truck, a motorcycle, a train, a tractor, a ship, a submarine, an aircraft and a space craft. The mechanical system 12 may also or alternatively be configured as an autonomous mobile robot, a crane, a conveyor system and/or any other type of mechanically driven consumer, industrial and/or military equipment. For ease of description, however, the powertrain 10 is described below as being included in an automobile and is referred to as element 12.

The powertrain 10 includes a drivetrain 14, a motor 16, a first brake system 18 and a second brake system 20. The powertrain 10 also includes a control system 22 in signal communication (e.g., hardwired and/or wirelessly connected) with one or more of the powertrain systems 16, 18 and 20.

Figure 2:
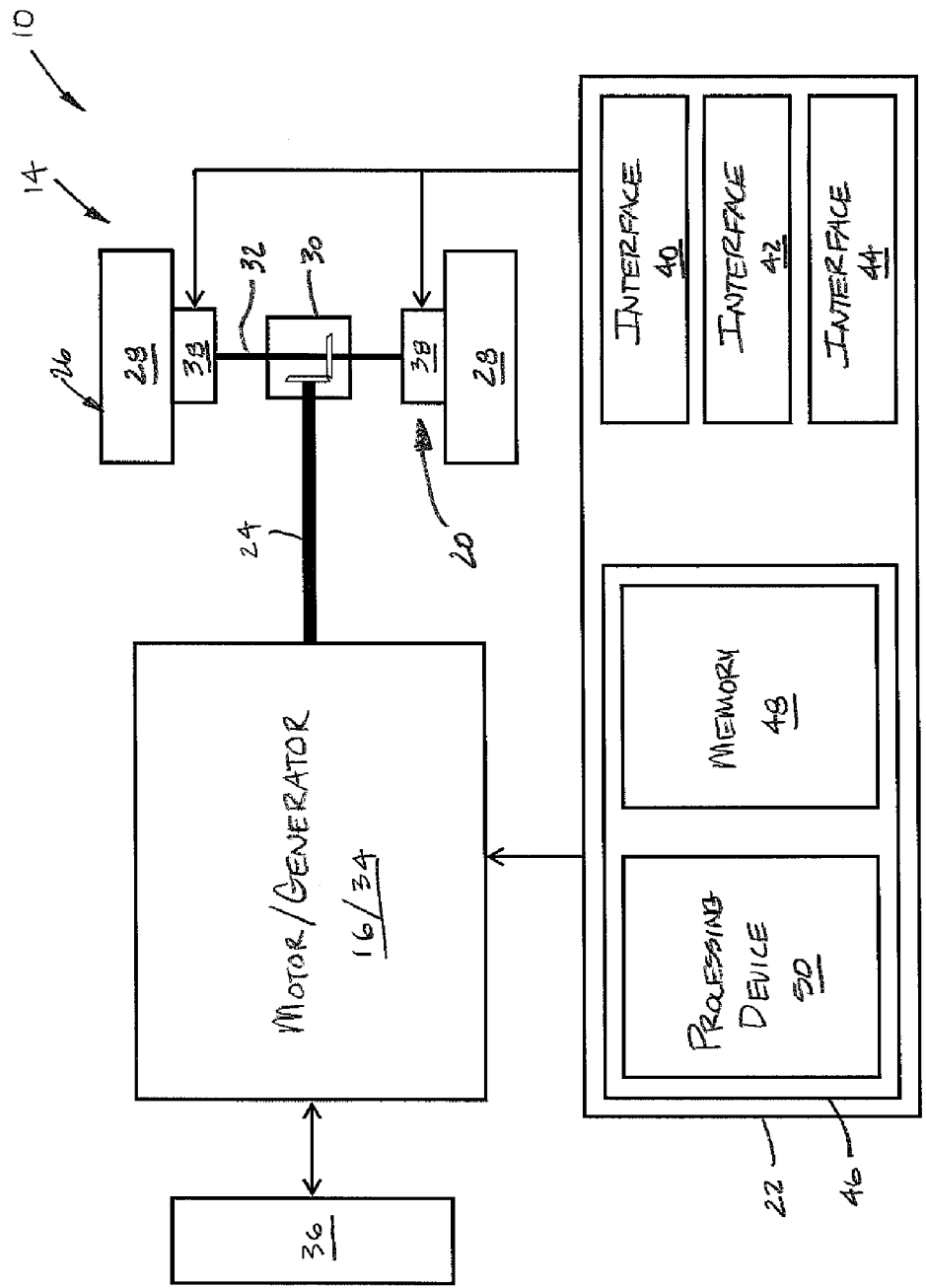
FIG. 2 is a detailed block diagram of an embodiment of the powertrain of FIG. 1.

The drivetrain 14 includes a rotatable power transfer device 24 and a mechanically powered load 26. Referring to FIG. 2, the power transfer device 24 may be configured as a driveshaft. However, various other rotatable power transfer devices are known in the art, and the powertrain 10 is not limited to including any particular types or configurations thereof. For example, the power transfer device 24 may alternatively be configured as or also include a gear, a sheave and/or an axle.

The load 26 may include one or more vehicle drive wheels 28. However, various other mechanically powered loads are known in the art, and the powertrain 10 is not limited to including any particular types or configurations thereof. For example, the load 26 may alternatively be configured as or also include a propeller, a winch, a pump and/or an electric generator.

The load 26 is connected to the power transfer device 24. The drive wheels 28 of FIG. 2, for example, are indirectly connected to the power transfer device 24 through one or more drivetrain components 30 and 32. Examples of a drivetrain component include, but are not limited to, a differential assembly (e.g., the component 30) and an axle (e.g., the component 32). In other embodiments, however, one or more of the drive wheels 28 may each be directly connected to the power transfer device 24.

Referring to FIG. 1, the motor 16 is adapted to mechanically power and is connected to the load 26 through the power transfer device 24. The motor 16 may be configured as an electric motor, which converts electric energy into mechanical energy; e.g., torque. Alternatively, the motor 16 may be configured as an internal combustion engine, which converts chemical energy stored in, for example, fossil fuel into mechanical energy. Still alternatively, the motor 16 may be configured as a steam, hydraulic or pneumatic system, which converts fluid energy to mechanical energy. The powertrain 10, however, is not limited to including any particular motor types or configurations.

The first brake system 18 and the second brake system 20 are adapted to independently or collectively brake rotation of at least the power transfer device 24 and/or the load 26. The term "brake" may describe a process of slowing rotational velocity of a rotor. The term "brake" may also or alternatively describe a process of stopping rotation of a rotor. The term "brake" may still also or alternatively describe a process of limiting or stopping rotational acceleration of a rotor. For example, a driver may apply brakes as the automobile 12 is going down a hill to maintain a certain speed.

The first brake system 18 may be configured as a regenerative brake system. The first brake system 18, for example, may include at least one electric generator 34. The generator 34 is adapted to receive mechanical energy from (e.g., be mechanically driven by) the load 26 where, for example, the automobile 12 is moving under its own momentum and/or the force of gravity. This transfer of mechanical energy from the load 26 to the generator 34 may reduce kinetic energy of the load 26 and thereby brake rotation of the load 26 and, thus, rotation of the power transfer device 24 which is connected to the load 26.

The generator 34 is further adapted to convert the mechanical energy received from the load 26 into electric energy and provide this electric energy to an energy storage device 36. Briefly, the energy storage device 36 is adapted to store the electric energy, and subsequently provide the stored energy to the motor 16 and/or one or more components/systems of the automobile 12. The energy storage device 36 may include one or more storage units. Examples of an energy storage unit include, but are not limited to, a battery (or a battery cell) and a capacitor.

In the embodiment of FIG. 2, the first brake system 18 and more, particularly, the generator 34 is configured with the motor 16. With such a configuration, the combination motor 16/generator 34 may be operated as a motor during a first mode of operation. In contrast, the combination motor 16/generator 34 may be operated as a generator during a second mode of operation.

Figure 3:
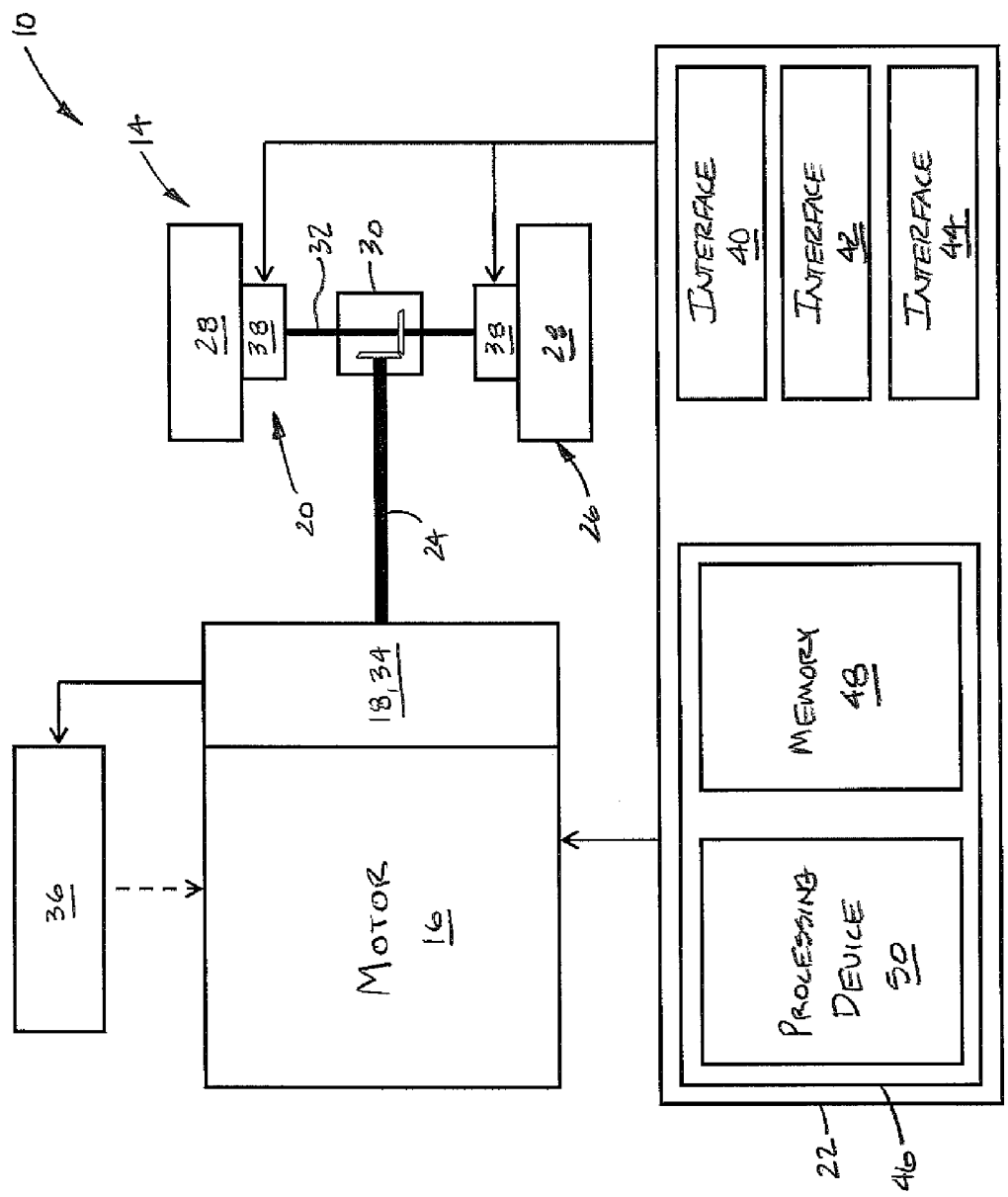
FIG. 3 is a detailed block diagram of another embodiment of the powertrain of FIG. 1.

In the embodiment of FIG. 3, the first brake system 18 and more, particularly, the generator 34 is configured discrete from the motor 16. The generator 34, for example, may be connected between the motor 16 and the power transfer device 24. Of course, in other embodiments, the generator 34 may be connected between the power transfer device 24 and the load 26, or the motor 16 may be connected between the power transfer device 24 and the generator 34.

Referring to FIG. 1, the second brake system 20 may be configured as a friction brake system. The second brake system 20, for example, may include one or more friction brakes 38. Examples of a friction brake include, but are not limited to, a disk brake, a drum brake or any other braking device that utilizes at least one brake pad. Each of the friction brakes 38 may be configured with a respective one of the drive wheels 28 (see FIG. 2). Of course, in other embodiments, one or more of the friction brakes 38 may be configured with the power transfer device 24, the motor 16, etc.

The control system 22 includes a plurality of user interfaces 40, 42 and 44 and a controller 46. The first user interface 40 is adapted to receive an input (e.g., a command) from a user (e.g., a driver). The first user interface 40 is further adapted to actuate the first brake system 18 based on the received input. For example, the first user interface 40 may be configured as or include a brake pedal, which may be mechanically and/or electronically linked with the first brake system 18. With this configuration, when the user depresses the pedal, the first brake system 18 may be signaled to brake rotation of the power transfer device 24 and/or the load 26. This brake signal may be relayed from the first user interface 40 to the first brake system 18 through the controller 46 and/or one or more other relays and/or processing devices. Alternatively, the brake signal may be provided directly from, for example, a sensor configured with the brake pedal to the first brake system 18.

The second user interface 42 is adapted to receive an input from the user. The second user interface 42 is further adapted to actuate the second brake system 20 based on the received input. For example, the second user interface 42 may be configured as or include a brake pedal, which may be mechanically and/or electronically linked with the second brake system 20. With this configuration, when the user depresses the pedal, the second brake system 20 may be signaled to brake rotation of the power transfer device 24 and/or the load 26. This brake signal may be relayed from the second user interface 42 to the second brake system 20 through the controller 46 and/or one or more other relays and/or processing devices. Alternatively, the brake signal may be provided directly from, for example, a sensor configured with the brake pedal to the second brake system 20.

The third user interface 44 is adapted to receive an input from the user. The third user interface 44 is further adapted to actuate the motor 16 based on the received input. For example, the third user interface 44 may be configured as or include an accelerator pedal, which may be mechanically and/or electronically linked with the motor 16. With this configuration, when the user depresses the pedal, the motor 16 may be signaled to accelerate rotation of the power transfer device 24 and/or the load 26. This acceleration signal may be relayed from the third user interface 44 to the motor 16 through the controller 46 and/or one or more other relays and/or processing devices. Alternatively, the acceleration signal may be provided directly from, for example, a sensor configured with the accelerator pedal to the motor 16.

The user interfaces 40, 42 and 44 are described above as (e.g., foot) pedals for ease of description. However, various other user interfaces are known in the art, and the control system 22 is not limited to including any particular types or configurations thereof. For example, in some embodiments, one or more of the user interfaces 40, 42 and 44 may each be configured as a push button, at least a portion of a touch screen, a lever, a microphone that receives an audible command, etc.

The controller 46 may be implemented using a combination of hardware and software. The hardware may include memory 48 and a processing device 50, which includes one or more single-core and/or multi-core processors. The hardware, of course, may also or alternatively include analog and/or digital circuitry other than that described above.

The memory 48 is configured to store software (e.g., program instructions) for execution of one or more methods, such as that described below, by the controller 46 and the processing device 50. The memory 48 may be a non-transitory computer readable medium. The memory 48 may include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 4:
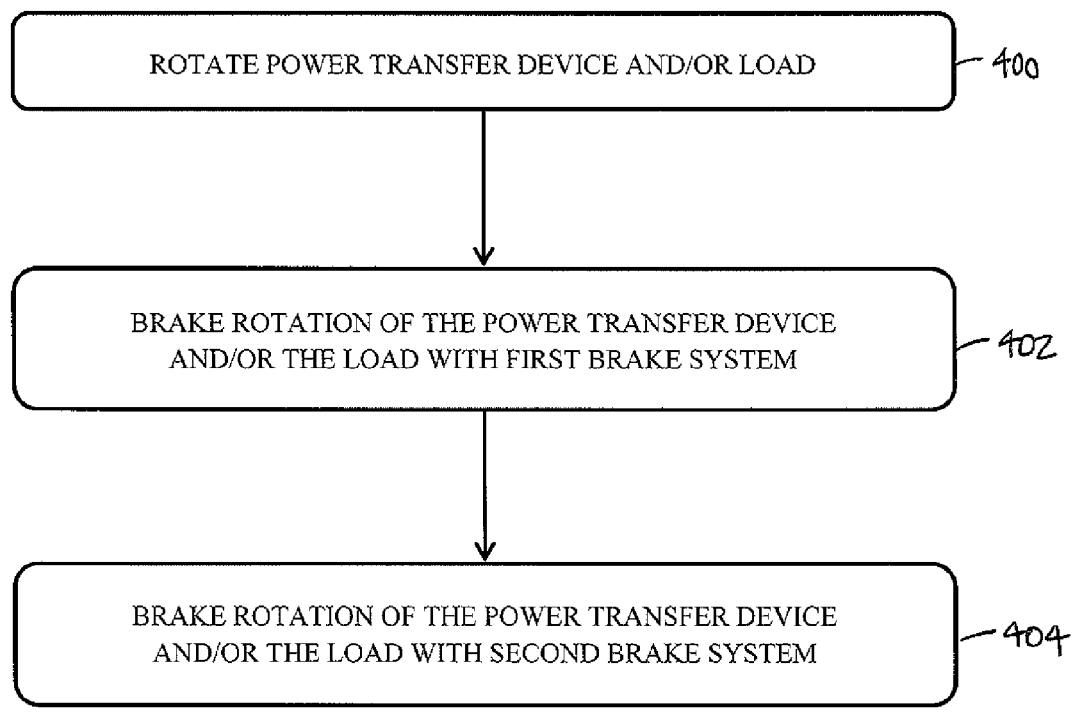
FIG. 4 is a flow diagram of a method for operating the powertrain of FIG. 1.

FIG. 4 is a flow diagram of a method for controlling operation of a powertrain such as the powertrain 10 of FIG. 1. In step 400, the motor 16 rotates the power transfer device 24 and/or the load 26. The third user interface 44, for example, may receive an input from a user for the automobile 12 to move. Based on this input, the third user interface 44 may signal the motor 16 to rotate the power transfer device 24 and the drive wheels 28 of the load 26.

In step 402, the first brake system 18 brakes rotation of the power transfer device 24 and/or the load 26. The first user interface 40, for example, may receive an input from the user for the automobile 12 to slow down. Based on this input, the first user interface 40 may signal the first brake system 18 to brake (e.g., slow) rotation of the power transfer device 24 and the drive wheels 28 of the load 26. During this step, the first brake system 18 may also generate electric energy as described above, and provide the generated energy to the energy storage device 36 for later use.

In step 404, the second brake system 20 brakes rotation of the power transfer device 24 and/or the load 26. The second user interface 42, for example, may receive an input from the user for the automobile 12 to slow down further and/or stop. Based on this input, the second user interface 42 may signal the second brake system 20 to brake (e.g., slow or stop) rotation of the power transfer device 24 and the drive wheels 28 of the load 26.

It is worth noting, one or more of the foregoing steps may be performed in an order other than that described above and illustrated in FIG. 4. For example, the braking step 402 may be performed after the braking step 404. The braking step 402 may also or alternatively be performed concurrently with the braking step 404. The method of FIG. 4 may also or alternatively include additional steps other than those described above. For example, the step 400 may be repeated between performance of the braking steps 402 and 404 and/or after the performance of the braking step 404.

Referring to FIG. 5, in some embodiments, the first brake system 18 may alternatively (or also) be configured as a power brake system. The first brake system 18, for example, may include an electric motor 52. This motor 52 may be configured discrete from or with the motor 16 (and/or the generator 34). The motor 52 is adapted to convert electric energy, for example received from the energy storage device 36, into mechanical energy for braking rotation of the power transfer device 24 and/or the load 26. More particularly, the motor 52 may apply a reverse torque to the power transfer device 24 and/or the load 26. The motor 52, for example, may be operated so as to rotate in a direct opposite the rotation of the power transfer device 24 and/or the load 26. A magnitude of the reverse torque applied by the motor 52 may be relatively small, however, to reduce internal stresses within the components of the powertrain 10.

In some embodiments, the second brake system 20 may be configured as another regenerative brake system similar to the one described above. In some embodiments, the second brake system 20 may be configured as another power brake system similar to the one described above. The second brake system 20, however, is not limited to any particular brake system types or configurations.

In some embodiments, the powertrain 10 may include a transmission. This transmission may be configured between the motor 16 and the power transfer device 24. The transmission may be configured as an automatic transmission, a continuously variable transmission (CVT), or a manual transmission. The transmission may also be configured as a clutchless transmission.

In some embodiments, the powertrain 10 may include a plurality of the motors 16. Each of these motors 16 may be configured to mechanically drive a discrete load 26; e.g., a discrete drive wheel 28.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

Although the description above contains many specific examples, these should not be construed as limiting the scope of the embodiments of the present disclosure, but as merely providing illustrations of some of the presently preferred embodiments of the present invention. It will be appreciated by those skilled in the art that changes could be made to the embodiments described above without departing from the broad inventive concept thereof. It is to be understood therefore that this disclosure is not limited to the specific embodiments disclosed herein, but it is intended to cover modifications within the spirit and scope of the embodiments of the present disclosure. Accordingly, the present invention is not to be restricted except in light of the attached claims and their equivalents.

What is claimed is:

1. A vehicle to be operated by an individual, the vehicle comprising:
   an energy storage device comprising a battery;
   a drivetrain including a drive shaft, a differential and a plurality of wheels, the differential configured to transfer torque between the drive shaft and one or more of the plurality of the wheels;
   an electric motor configured to convert electrical energy received from the energy storage device into mechanical energy during a first mode of operation to rotate the drive shaft and thereby the one or more of the plurality of the wheels, wherein the electric motor applies a torque having a first rotational direction onto the drive shaft during the first mode of operation;
   a first brake system configured with the electric motor, the first brake system configured as a power brake system such that the electric motor converts electrical energy received from the energy storage device into mechanical energy to brake rotation of the drive shaft and thereby the one or more of the plurality of the wheels during a second mode of operation, wherein the electric motor applies a torque having a second rotational direction onto the drive shaft during the second mode of operation, and the second rotational direction is opposite the first rotational direction;
   a second brake system adapted to brake rotation of the drive shaft and thereby the one or more of the plurality of the wheels;
   a first user interface adapted to actuate the first brake system in response to receiving a command from the individual; and
   a second user interface adapted to actuate the second brake system in response to receiving a command from the individual, the second user interface being discrete from the first user interface.

2. The vehicle of claim 1, wherein the first brake system is further configured as a regenerative brake system such that the electric motor converts mechanical energy received from the drive shaft into electrical energy, which is provided to and stored by the energy storage device, to brake rotation of the drive shaft and thereby the one or more of the plurality of the wheels during a third mode of operation.

3. The vehicle of claim 1, wherein the second brake system comprises a friction brake system.

4. The vehicle of claim 1, wherein the second brake system comprises a regenerative brake system.

5. The vehicle of claim 1, wherein the second brake system comprises a power brake system.

6. The vehicle of claim 1, wherein the first user interface comprises a first pedal, and the second user interface comprises a second pedal.

7. The vehicle of claim 1, wherein the one or more of the plurality of wheels comprises the plurality of wheels such that the differential is configured to transfer torque between the drive shaft and the plurality of wheels.

8. The vehicle of claim 1, further comprising a transmission coupled between and configured to transfer torque between the electric motor and the drive shaft.

9. The vehicle of claim 1, wherein the drivetrain comprises an automobile or truck drivetrain.

10. The vehicle of claim 1, wherein the drivetrain comprises a drivetrain for a piece of industrial equipment.

\* \* \* \* \*